US012020847B2

(12) United States Patent
Takai et al.

(10) Patent No.: US 12,020,847 B2
(45) Date of Patent: Jun. 25, 2024

(54) MULTILAYER COIL COMPONENT

(71) Applicant: Murata Manufacturing Co., Ltd., Kyoto-fu (JP)

(72) Inventors: Shun Takai, Nagaokakyo (JP); Makoto Yamamoto, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 587 days.

(21) Appl. No.: 17/131,573

(22) Filed: Dec. 22, 2020

(65) Prior Publication Data

US 2021/0202160 A1 Jul. 1, 2021

(30) Foreign Application Priority Data

Dec. 27, 2019 (JP) ................................. 2019-238902

(51) Int. Cl.
*H01F 27/29* (2006.01)
*H01F 17/00* (2006.01)
*H01F 27/32* (2006.01)
*H01F 41/04* (2006.01)

(52) U.S. Cl.
CPC ....... *H01F 27/292* (2013.01); *H01F 17/0013* (2013.01); *H01F 27/324* (2013.01); *H01F 41/041* (2013.01)

(58) Field of Classification Search
CPC .. H01F 27/292; H01F 17/0013; H01F 27/324; H01F 41/041
See application file for complete search history.

(56) References Cited

U.S. PATENT DOCUMENTS

| | | | | |
|---|---|---|---|---|
| 2004/0084131 A1* | 5/2004 | Konoue | ................ | H01F 41/046 156/89.12 |
| 2009/0115563 A1* | 5/2009 | Arata | .................. | H01F 17/0013 336/200 |
| 2012/0326827 A1* | 12/2012 | Nanjyo | ............... | H01F 17/0033 336/200 |
| 2020/0203051 A1* | 6/2020 | Kazuta | .................... | H01F 27/32 |
| 2021/0012947 A1* | 1/2021 | Ishima | ................ | H01F 27/2804 |

FOREIGN PATENT DOCUMENTS

| | | | | | |
|---|---|---|---|---|---|
| JP | H04-65807 A | | 3/1992 | | |
| JP | H10-106840 A | | 4/1998 | | |
| JP | H10106840 A | * | 4/1998 | | |
| JP | 2005-294725 A | | 10/2005 | | |
| JP | 2006148027 A | * | 6/2006 | | |
| JP | 2009-117664 A | | 5/2009 | | |
| JP | 2011-009391 A | | 1/2011 | | |
| JP | 2015-032791 A | | 2/2015 | | |
| JP | 2015032791 A | * | 2/2015 | | |
| JP | 2019-047015 A | | 3/2019 | | |
| JP | 2019-102691 A | | 6/2019 | | |
| WO | WO-2010084794 A1 | * | 7/2010 | ......... | H01F 17/0013 |

* cited by examiner

*Primary Examiner* — Malcolm Barnes

(74) *Attorney, Agent, or Firm* — Studebaker & Brackett PC

(57) ABSTRACT

A multilayer coil component includes an insulator portion, a coil embedded in the insulator portion and including a plurality of coil conductor layers electrically connected together, and an outer electrode disposed on a surface of the insulator portion and electrically connected to the coil. The coil conductor layers have a thickness of 30 μm to 60 μm. The coil conductor layers are rectangular and include a corner portion with a radius of curvature of 0.08 mm to 0.24 mm.

11 Claims, 5 Drawing Sheets

MULTILAYER COIL COMPONENT

CROSS-REFERENCE TO RELATED APPLICATION

This application claims benefit of priority to Japanese Patent Application No. 2019-238902, filed Dec. 27, 2019, the entire contents of which is incorporated herein by reference.

BACKGROUND

Technical Field

The present disclosure relates to multilayer coil components and methods for manufacturing multilayer coil components.

Background Art

An example of a multilayer coil component known in the related art includes a body and a coil disposed in the body, as described, for example, in Japanese Unexamined Patent Application Publication No. 2019-47015. The multilayer coil component disclosed in Japanese Unexamined Patent Application Publication No. 2019-47015 is manufactured by a method of manufacture that includes forming coil conductor layers with a thickness of about 30 μm on magnetic layers for formation of the body and then forming different magnetic layers for step coverage over the magnetic layers to form coil conductor printed sheets, bonding the coil conductor printed sheets together by pressure to obtain an unfired multilayer body, and firing the multilayer body.

The recent trend toward a higher current in electronic devices has led to a need for a multilayer coil component with a lower direct current resistance. To reduce the direct current resistance, it is generally necessary to increase the thickness of a conductor forming a coil so that the conductor has a larger cross-sectional area. In this case, a magnetic paste is applied by printing to the area where the coil conductor layer is not formed to achieve uniform thickness in the area where the coil conductor layer is formed and the area where the coil conductor layer is not formed. In this process, the magnetic paste may be applied by printing such that part of the magnetic paste layer overlaps the edge portions of the coil conductor layer, as described in Japanese Unexamined Patent Application Publication No. 2019-47015. Such printing with the magnetic paste may result in formation of a magnetic paste layer including a thicker portion and a thinner portion. Because the difference in thickness leads to a difference in drying speed, the resulting stress may cause cracking.

SUMMARY

Accordingly, the present disclosure provides a multilayer coil component that includes thick coil conductor layers and that is less susceptible to cracking and a method for manufacturing such a multilayer coil component.

According to preferred embodiments of the present disclosure, there is provided a multilayer coil component including an insulator portion, a coil embedded in the insulator portion and including a plurality of coil conductor layers electrically connected together, and an outer electrode disposed on a surface of the insulator portion and electrically connected to the coil. The coil conductor layers have a thickness of 30 μm to 60 μm. The coil conductor layers are rectangular and include a corner portion with a radius of curvature of 0.08 mm to 0.24 mm.

In the multilayer coil component, the insulator portion may be a multilayer body including first and second insulator layers. The coil conductor layers may be disposed on the first insulator layers. The second insulator layers may be disposed on the first insulator layers so as to be adjacent to the coil conductor layers.

In the multilayer coil component, the coil conductor layers may have an aspect ratio of 0.15 to 0.30.

The multilayer coil component may have voids between the coil conductor layers and the insulator portion.

According to preferred embodiments of the present disclosure, there is also provided a method for manufacturing a multilayer coil component including an insulator portion, a coil embedded in the insulator portion and including a plurality of coil conductor layers electrically connected together, and an outer electrode disposed on a surface of the insulator portion and electrically connected to the coil. The method includes (a) forming a first insulating paste layer from an insulating paste, (b) forming a rectangular conductive paste layer on the first insulating paste layer, (c) forming a second insulating paste layer from an insulating paste on the first insulating paste layer so as to be adjacent to the conductive paste layer, repeating steps (a) to (c) to form an unfired multilayer body, and firing the unfired multilayer body. The conductive paste layers include a corner portion with a radius of curvature of 0.10 mm to 0.30 mm.

The method may further include, after forming the first insulating paste layer, the conductive paste layer, and the second insulating paste layer in steps (a) to (c), pressing the individual layers at a pressure of 4 MPa to 8 MPa.

According to preferred embodiments of the present disclosure, it is possible to provide a multilayer coil component that includes thick coil conductor layers and that is less susceptible to cracking, that is, a multilayer coil component that can be used in high-current applications and that has high reliability.

Other features, elements, characteristics and advantages of the present disclosure will become more apparent from the following detailed description of preferred embodiments of the present disclosure with reference to the attached drawings.

DETAILED DESCRIPTION

A multilayer coil component according to an embodiment of the present disclosure will hereinafter be described in detail with reference to the drawings. However, the shapes, arrangements, and other details of the multilayer coil component according to the present embodiment and the individual constituent elements thereof are not limited to the illustrated example.

Figure 1:
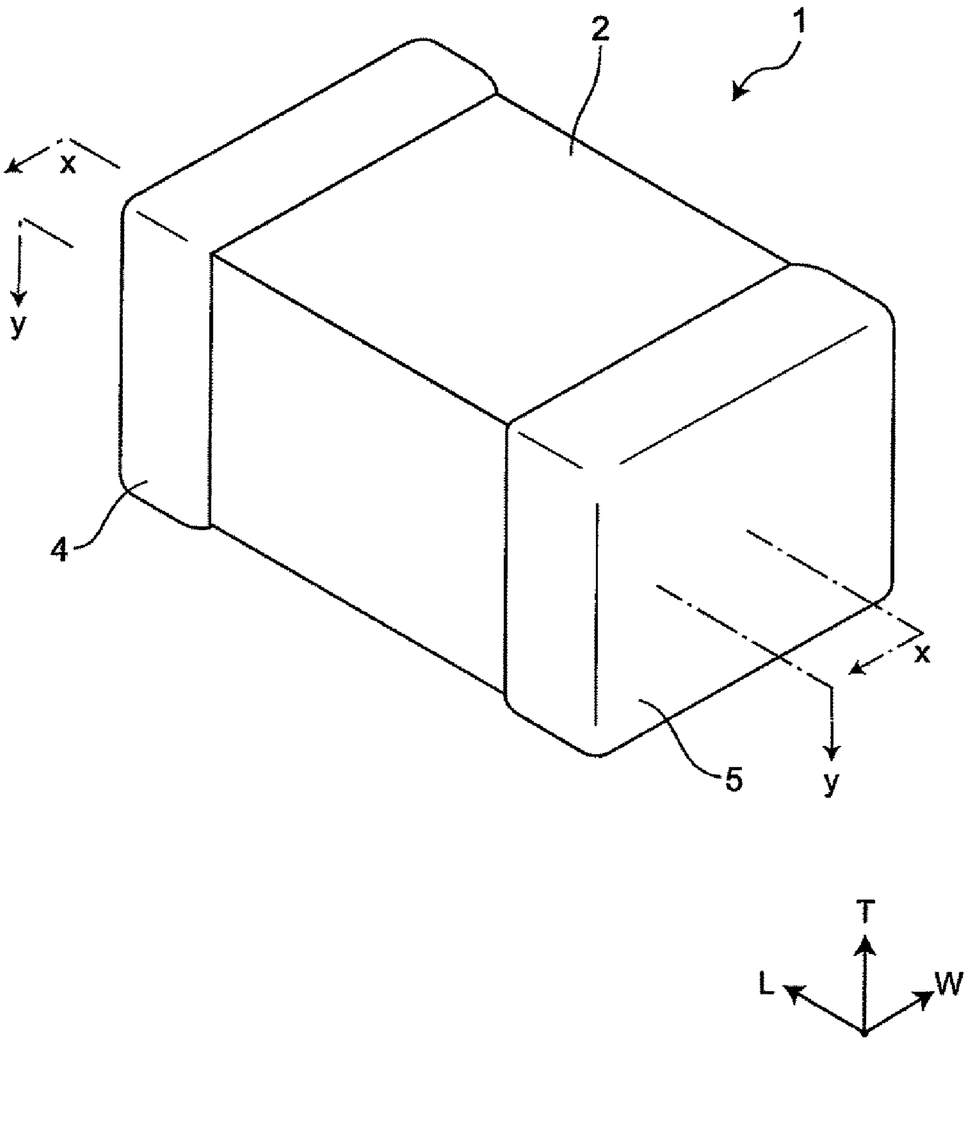
FIG. 1 is a schematic perspective view of a multilayer coil component 1 according to an embodiment of the present disclosure.
Figure 2:
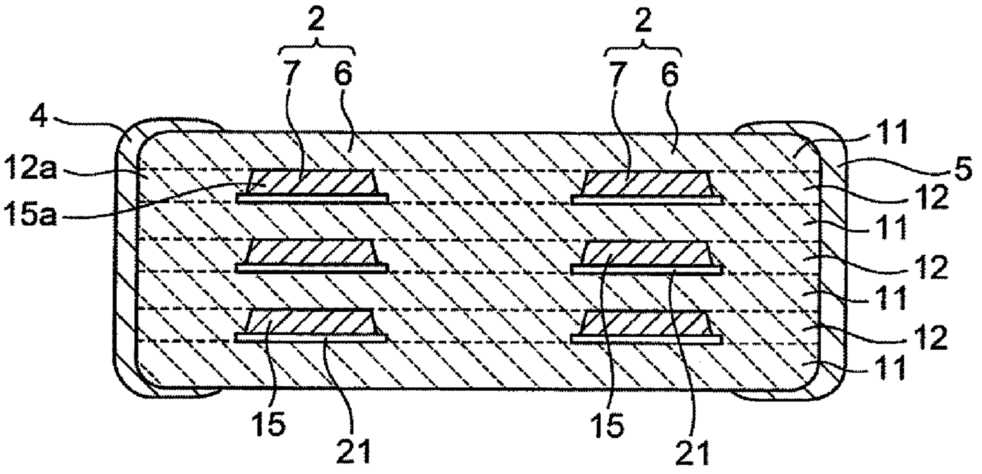
FIG. 2 is a sectional view illustrating a cross-section of the multilayer coil component 1 taken along line x-x in FIG. 1.
Figure 3:
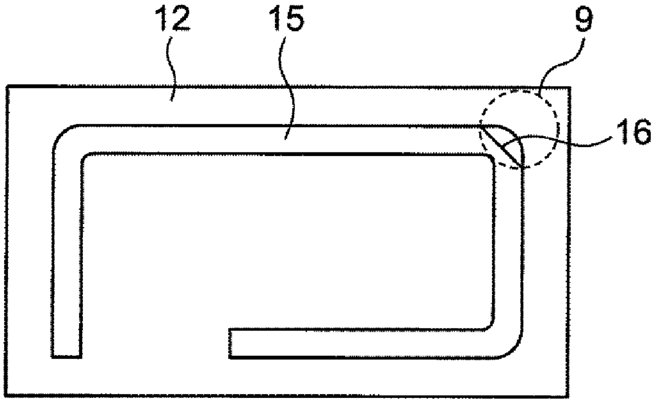
FIG. 3 is a sectional view illustrating a cross-section of the multilayer coil component 1 taken along line y-y in FIG. 1.
Figure 4:
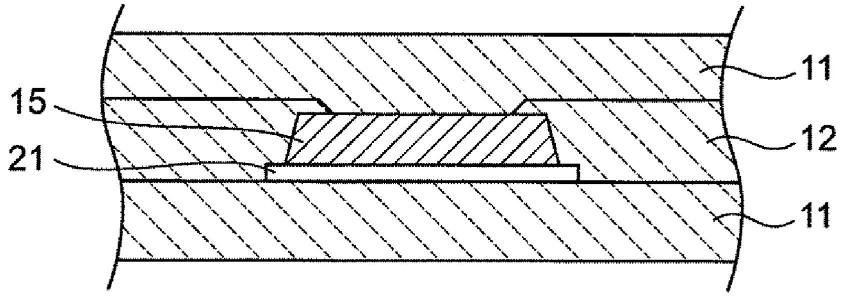
FIG. 4 is an enlarged view of a cross-section of a coil conductor portion of the multilayer coil component 1.

FIG. 1 illustrates a perspective view of a multilayer coil component 1 according to the present embodiment. FIG. 2 illustrates a sectional view taken along line x-x in FIG. 1. FIG. 3 illustrates a sectional view taken along line y-y in FIG. 1. However, the shapes, arrangements, and other details of the multilayer coil component according to the embodiment described below and the individual constituent elements thereof are not limited to the illustrated example.

As illustrated in FIGS. 1 to 3, the multilayer coil component 1 according to the present embodiment has a substantially rectangular parallelepiped shape. The surfaces of the multilayer coil component 1 perpendicular to the L axis in FIG. 1 are referred to as "end surface". The surfaces of the multilayer coil component 1 perpendicular to the W axis in FIG. 1 are referred to as "side surface". The surfaces of the multilayer coil component 1 perpendicular to the T axis in FIG. 1 are referred to as "upper surface" and "lower surface". The multilayer coil component 1 generally includes a body 2 and outer electrodes 4 and 5 disposed on both end surfaces of the body 2. The body 2 includes an insulator portion 6 and a coil 7 embedded in the insulator portion 6. The insulator portion 6 includes first insulator layers 11 and second insulator layers 12. The coil 7 is composed of coil conductor layers 15 connected together in a coil pattern via connection conductors (not illustrated) extending through the first insulator layers 11. As illustrated in FIG. 3, the coil conductor layers 15 forming the coil 7 are substantially rectangular when viewed in plan view in the stacking direction. The substantially rectangular coil conductor layers 15 include rounded corner portions 9 (enclosed by the dotted line in FIG. 3). The coil 7 is connected to the outer electrodes 4 and 5 via extended portions disposed at both ends of the coil 7. The multilayer coil component 1 has voids 21 between the insulator portion 6 and the main surfaces (lower main surfaces in FIG. 2) of the coil conductor layers 15, that is, between the first insulator layers 11 and the coil conductor layers 15.

The above multilayer coil component 1 according to the present embodiment will hereinafter be described together with a method of manufacture thereof. The embodiment described herein is an embodiment in which the insulator portion 6 is formed from a ferrite material.

(1) Preparation of Ferrite Paste

A ferrite material is first prepared. The ferrite material contains Fe, Zn, and Ni as the main constituents and further contains Cu as desired. Typically, the main constituents of the ferrite material are substantially composed of Fe, Zn, Ni, and Cu oxides (ideally, $Fe_2O_3$, ZnO, NiO, and CuO).

As the ferrite material, $Fe_2O_3$, ZnO, CuO, NiO, and optionally additive constituents are weighed so as to give a predetermined composition and are mixed and pulverized. The pulverized ferrite material is dried and calcined to obtain a calcined powder. Predetermined amounts of a solvent (e.g., a ketone-based solvent), a resin (e.g., polyvinyl acetal), and a plasticizer (e.g., an alkyd-based plasticizer) are added to the calcined powder, and they are mixed in a machine such as a planetary mixer and are further dispersed in a machine such as a three-roll mill. Thus, a ferrite paste can be prepared.

The Fe content of the ferrite material on an $Fe_2O_3$ basis may preferably be about 40.0 mol % to about 49.5 mol %, more preferably about 45.0 mol % to about 49.5 mol % (based on the total amount of the main constituents; the same applies hereinafter).

The Zn content of the ferrite material on a ZnO basis may preferably be about 5.0 mol % to about 35.0 mol %, more preferably about 10.0 mol % to about 30.0 mol % (based on the total amount of the main constituents; the same applies hereinafter).

The Cu content of the ferrite material on a CuO basis is preferably about 4.0 mol % to about 12.0 mol %, more preferably about 7.0 mol % to about 10.0 mol % (based on the total amount of the main constituents; the same applies hereinafter).

The Ni content of the ferrite material is not particularly limited and may be the balance excluding the other main constituents described above, namely, Fe, Zn, and Cu.

In one embodiment, the ferrite material contains Fe in an amount, on an $Fe_2O_3$ basis, of about 40.0 mol % to about 49.5 mol %, Zn in an amount, on a ZnO basis, of about 5.0 mol % to about 35.0 mol %, and Cu in an amount, on a CuO basis, of about 4.0 mol % to about 12.0 mol %, the balance being NiO.

In the present embodiment, the ferrite material may further contain additive constituents. Examples of additive constituents for the ferrite material include, but not limited to, Mn, Co, Sn, Bi, and Si. The Mn, Co, Sn, Bi, and Si contents (amounts added) on $Mn_3O_4$, $CO_3O_4$, $SnO_2$, $Bi_2O_3$, and $SiO_2$ bases are each preferably about 0.1 parts by weight to about 1 part by weight based on a total of 100 parts by weight of the main constituents (i.e., Fe (on an $Fe_2O_3$ basis), Zn (on a ZnO basis), Cu (on a CuO basis), and Ni (on a NiO basis)). The ferrite material may further contain incidental impurities introduced during manufacture.

The Fe content (on an $Fe_2O_3$ basis), Mn content (on a $Mn_2O_3$ basis), Cu content (on a CuO basis), Zn content (on a ZnO basis), and Ni content (on a NiO basis) of the sintered ferrite may be assumed to be substantially equal to the Fe content (on an $Fe_2O_3$ basis), Mn content (on a $Mn_2O_3$ basis), Cu content (on a CuO basis), Zn content (on a ZnO basis), and Ni content (on a NiO basis) of the ferrite material before firing.

(2) Preparation of Conductive Paste for Coil Conductors

A conductive material is first prepared. The conductive material may be, for example, Au, Ag, Cu, Pd, or Ni, preferably Ag or Cu, more preferably Ag. A predetermined amount of a powder of the conductive material is weighed and mixed with predetermined amounts of a solvent (e.g., eugenol), a resin (e.g., ethylcellulose), and a dispersant in a machine such as a planetary mixer and is then dispersed in a machine such as a three-roll mill. Thus, a conductive paste for coil conductors can be prepared.

(3) Preparation of Resin Paste

A resin paste for formation of voids in the multilayer coil component 1 is prepared. The resin paste can be prepared by adding a resin (e.g., an acrylic resin) that disappears during firing to a solvent (e.g., isophorone).

(4) Fabrication of Multilayer Coil Component (4-1) Fabrication of Body

Figures 5A, 5B, 5C, 5D, 5E, 5F, 5G, 5H, 5I, 5J, 5K, 5L, 5M, 5N, 5O, 5P, 5Q, 5R, 5S:
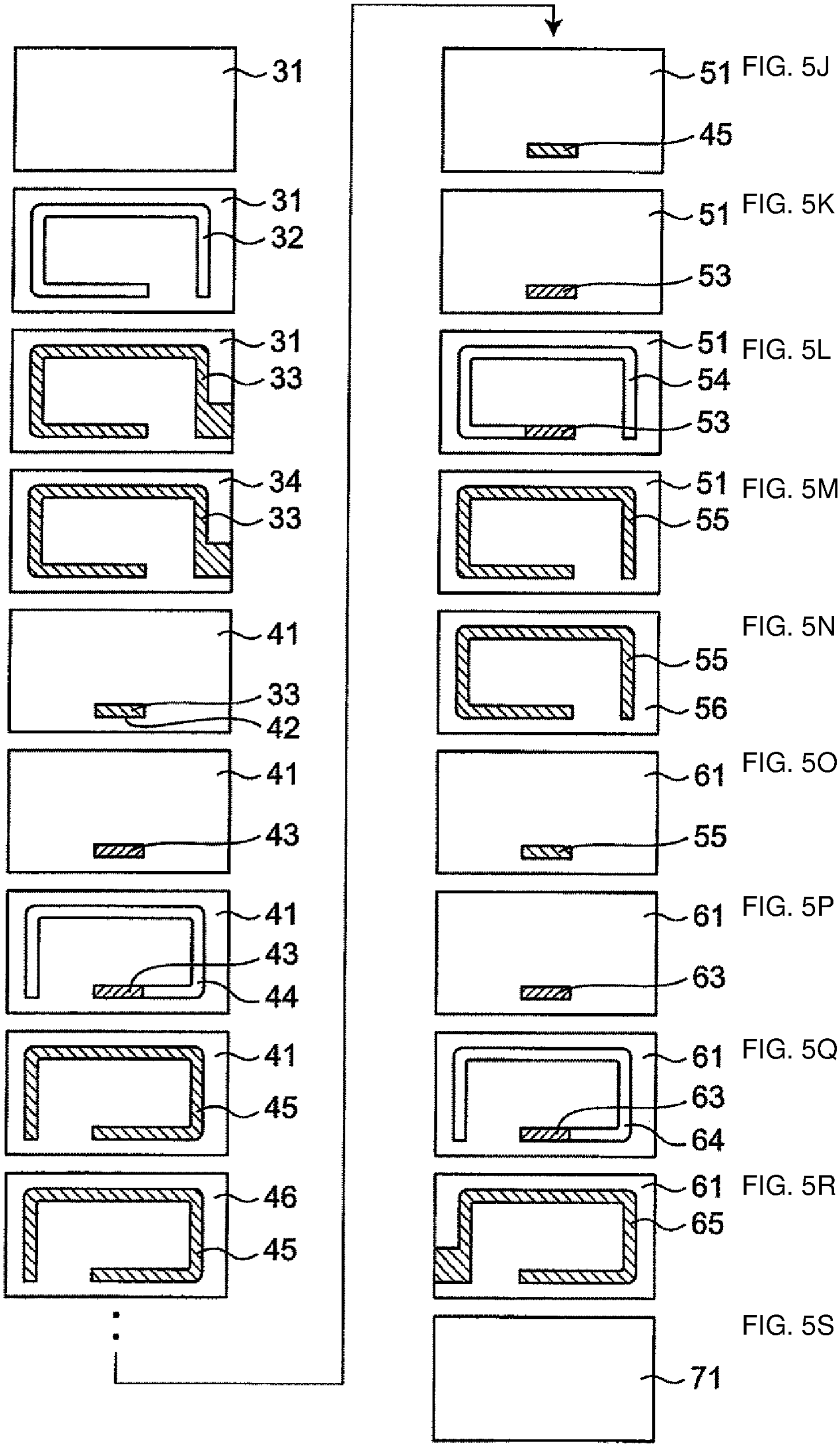
FIGS. 5A to 5S illustrate a method for manufacturing the multilayer coil component 1 illustrated in FIG. 1.

A thermal release sheet and a polyethylene terephthalate (PET) film are first stacked on a metal plate (not illustrated). The ferrite paste is applied by printing a predetermined number of times to form a first ferrite paste layer 31 that forms an outer layer (FIG. 5A). This layer corresponds to the first insulator layers 11.

The resin paste is then applied by printing to the area where the void 21 is to be formed to form a resin paste layer 32 (FIG. 5B).

The conductive paste is then applied by printing to the area where the coil conductor layer 15 is to be formed to form a conductive paste layer 33 (FIG. 5C).

The thickness of the conductive paste layer may preferably be about 50 μm to about 120 μm, more preferably about 70 μm to about 100 μm, even more preferably about 80 μm to about 100 μm. As the thickness of the conductive paste layer becomes larger, the thickness of the resulting coil conductor layer becomes larger, and the resistance becomes lower.

The conductive paste layer is formed such that the winding portions of the coil are substantially rectangular when viewed in plan view in the stacking direction. That is, the conductive paste layer is formed so as to be substantially rectangular. The conductive paste layer, however, need not form a complete rectangle, but may instead be formed so as to form a portion of a rectangle, preferably at least two sides, more preferably at least three sides, particularly preferably at least three sides and a portion of the remaining side.

The conductive paste layer includes rounded corner portions when viewed in plan view in the stacking direction. The corner portions of the conductive paste layer may have a radius of curvature R of about 0.10 mm to about 0.30 mm, preferably about 0.15 mm to about 0.25 mm. If the corner portions of the conductive paste layer have a radius of curvature R of about 0.10 mm or more, a stress induced during drying can be alleviated, and cracking can thus be inhibited. If the corner portions of the conductive paste layer have a radius of curvature R of about 0.30 mm or less, the volume of the magnetic part can be effectively utilized, and good electrical characteristics can thus be achieved. Here, the radius of curvature R of the corner portions of the conductive paste layer refers to the radius of curvature of the outermost side portions of the corner portions of the conductive paste layer.

The conductive paste layer is preferably formed so as to have an aspect ratio of about 0.15 to about 0.30, more preferably about 0.20 to about 0.25. Here, the aspect ratio refers to the ratio of the thickness to the width of the conductive paste layer.

Figure 6:
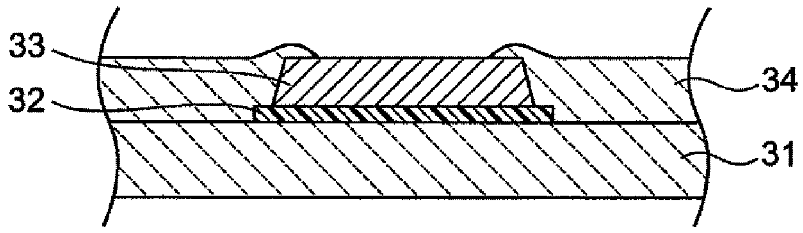
FIG. 6 is an enlarged view of a cross-section of a coil conductor portion in FIG. 5D.

The ferrite paste is then applied by printing to the region where the conductive paste layer 33 is not formed to form a second ferrite paste layer 34 (FIG. 5D). The second ferrite paste layer 34 is preferably provided so as to cover the outer edge portions of the conductive paste layer 33 (FIG. 6). This layer corresponds to the second insulator layers 12.

The ferrite paste is then applied by printing to the region other than the area where a connection conductor for connecting coil conductor layers adjacent to each other in the stacking direction is to be formed to form a first ferrite paste layer 41 (FIG. 5E). This layer corresponds to the first insulator layers 11. A hole 42 is formed in the area where the connection conductor is to be formed.

The conductive paste is then applied by printing to the hole 42 to form a connection conductor paste layer 43 (FIG. 5F).

Steps similar to those in FIGS. 5B to 5F are then repeated to form the individual layers (e.g., FIGS. 5G to 5R). Finally, the ferrite paste is applied by printing a predetermined number of times to form a first ferrite paste layer 71 that forms an outer layer (FIG. 5S). This layer corresponds to the first insulator layers 11.

In a preferred embodiment, after the formation of the ferrite paste layers, the resin paste layers, the conductive paste layers, and the connection conductor paste layers, the surfaces thereof may be smoothed by pressing. Pressing is preferably performed after the formation of at least the conductive paste layer and the second ferrite paste layer, more preferably after the formation of each layer. The pressing pressure may preferably be about 4 MPa to about 8 MPa, more preferably about 6 MPa to about 8 MPa. If the pressing pressure is about 4 MPa or more, the main surfaces of the individual layers can be smoothed, and the reliability of the multilayer coil component can thus be increased.

The layers are then bonded together on the metal plate by pressure, followed by cooling and removal of the metal plate and then the PET film to obtain an element assembly (unfired multilayer block)). This unfired multilayer block is cut into individual bodies with a tool such as a dicer.

The resulting unfired bodies are subjected to barrel finishing to round the corners of the bodies. Barrel finishing may be performed either on the unfired multilayer bodies or on fired multilayer bodies. Barrel finishing may be performed either by a dry process or by a wet process. Barrel finishing may be performed by polishing the elements either with each other or with media.

After barrel finishing, the unfired bodies are fired at a temperature of, for example, about 910° C. to about 935° C. to obtain bodies 2 for multilayer coil components 1.

After firing, the resin paste layers disappear, thus forming the voids 21.

(4-2) Formation of Outer Electrodes

A Ag paste containing Ag and glass for formation of outer electrodes is then applied to the end surfaces of the bodies 2 and is baked to form underlying electrodes. A Ni coating and a Sn coating are then formed in sequence over the underlying electrodes by electrolytic plating to form outer electrodes. Thus, multilayer coil components 1 as illustrated in FIG. 1 are obtained.

The present embodiment provides a method of manufacture as described above, specifically, a method for manufacturing a multilayer coil component including an insulator portion, a coil embedded in the insulator portion and including a plurality of coil conductor layers electrically connected together, and an outer electrode disposed on a surface of the insulator portion and electrically connected to the coil. The method includes (a) forming a first insulating paste layer from an insulating paste, (b) forming a substantially rectangular conductive paste layer on the first insulating paste layer, (c) forming a second insulating paste layer from an insulating paste on the first insulating paste layer so as to be adjacent to the conductive paste layer, repeating steps (a) to (c) to form an unfired multilayer body, and firing the unfired multilayer body. The conductive paste layers include a corner portion with a radius of curvature of about 0.10 mm to about 0.30 mm.

In a preferred embodiment, the method of manufacture according to the present embodiment is a method for manufacturing a multilayer coil component as described above, further including, after forming the first insulating paste layer, the conductive paste layer, and the second insulating paste layer in steps (a) to (c), pressing the individual layers at a pressure of about 4 MPa to about 8 MPa.

Although one embodiment of the present disclosure has been described above, various modifications can be made to the present embodiment.

For example, in the above embodiment, elements may be obtained by preparing ferrite sheets corresponding to the individual insulating layers, forming coil patterns on the sheets by printing, and bonding the sheets together by pressure.

The multilayer coil components manufactured by the above method according to the present embodiment have low coil conductor resistance and are also less likely to suffer problems such as cracking.

Thus, the present embodiment also provides a multilayer coil component obtained by the above method of manufacture.

Specifically, the present embodiment provides a multilayer coil component including an insulator portion, a coil embedded in the insulator portion and including a plurality of coil conductor layers electrically connected together, and an outer electrode disposed on a surface of the insulator portion and electrically connected to the coil. The coil conductor layers have a thickness of about 30 μm to about 60 μm. The coil conductor layers are substantially rectangular and include a corner portion with a radius of curvature of about 0.08 mm to about 0.24 mm.

The body 2 of the multilayer coil component 1 according to the present embodiment is composed of the insulator portion 6 and the coil 7.

The insulator portion 6 may include the first insulator layers 11 and the second insulator layers 12.

The first insulator layers 11 are disposed between the coil conductor layers 15 adjacent to each other in the stacking direction and between the coil conductor layers 15 and the upper and lower surfaces of the body 2.

The second insulator layers 12 are disposed around the coil conductor layers 15 such that the upper surfaces (upper main surfaces in FIG. 2) of the coil conductor layers 15 are exposed. In other words, the second insulator layers 12 form layers at the same heights as the coil conductor layers 15 in the stacking direction. For example, the second insulator layer 12*a* in FIG. 2 is located at the same height as the coil conductor layer 15*a* in the stacking direction.

That is, in the multilayer coil component according to the present embodiment, the insulator portion is a multilayer body including first and second insulator layers, the coil conductor layers are disposed on the first insulator layers, and the second insulator layers are disposed on the first insulator layers so as to be adjacent to the coil conductor layers.

Thus, the present embodiment provides a multilayer coil component including an insulator portion including first and second insulator layers, a coil embedded in the insulator portion and including a plurality of coil conductor layers electrically connected together, and an outer electrode disposed on a surface of the insulator portion and electrically connected to the coil. The coil conductor layers are disposed on the first insulator layers. The second insulator layers are disposed on the first insulator layers so as to be adjacent to the coil conductor layers. In other words, the second insulator layers are disposed on the first insulator layers in regions where the coil conductor layers are not formed. The coil conductor layers have a thickness of about 30 μm to about 60 μm. The coil conductor layers are substantially rectangular and include a corner portion with a radius of curvature of about 0.08 mm to about 0.24 mm.

In one embodiment, portions of the second insulator layers 12 may be disposed so as to extend over the outer edge portions of the coil conductor layers 15. In other words, the second insulator layers 12 may be disposed so as to cover the outer edge portions of the coil conductor layers 15. That is, as the coil conductor layers 15 and the second insulator layers 12 adjacent to each other are viewed in plan view from the upper side, the second insulator layers 12 may extend inwardly of the outer edges of the coil conductor layers 15.

The first insulator layers 11 and the second insulator layers 12 may be integrated with each other in the body 2. In this case, the first insulator layers 11 can be assumed to be present between the coil conductor layers 15, whereas the second insulator layers 12 can be assumed to be present at the same heights as the coil conductor layers 15.

The insulator portion 6 is preferably formed of a magnetic material, more preferably a sintered ferrite. The sintered ferrite contains at least Fe, Ni, and Zn as the main constituents. The sintered ferrite may further contain Cu.

The first insulator layers 11 and the second insulator layers 12 may have the same composition or different compositions. In a preferred embodiment, the first insulator layers 11 and the second insulator layers 12 have the same composition.

In one embodiment, the sintered ferrite contains at least Fe, Ni, Zn, and Cu as the main constituents.

The Fe content of the sintered ferrite on an $Fe_2O_3$ basis may preferably be about 40.0 mol % to about 49.5 mol %, more preferably about 45.0 mol % to about 49.5 mol % (based on the total amount of the main constituents; the same applies hereinafter).

The Zn content of the sintered ferrite on a ZnO basis may preferably be about 5.0 mol % to about 35.0 mol %, more preferably about 10.0 mol % to about 30.0 mol % (based on the total amount of the main constituents; the same applies hereinafter).

The Cu content of the sintered ferrite on a CuO basis is preferably about 4.0 mol % to about 12.0 mol %, more preferably about 7.0 mol % to about 10.0 mol % (based on the total amount of the main constituents; the same applies hereinafter).

The Ni content of the sintered ferrite is not particularly limited and may be the balance excluding the other main constituents described above, namely, Fe, Zn, and Cu.

In one embodiment, the sintered ferrite contains Fe in an amount, on an $Fe_2O_3$ basis, of about 40.0 mol % to about 49.5 mol %, Zn in an amount, on a ZnO basis, of about 5.0 mol % to about 35.0 mol %, and Cu in an amount, on a CuO basis, of about 4.0 mol % to about 12.0 mol %, the balance being NiO.

In the present embodiment, the sintered ferrite may further contain additive constituents. Examples of additive constituents for the sintered ferrite include, but not limited to, Mn, Co, Sn, Bi, and Si. The Mn, Co, Sn, Bi, and Si contents (amounts added) on $Mn_3O_4$, $CO_3O_4$, $SnO_2$, $Bi_2O_3$, and $SiO_2$ bases are each preferably about 0.1 parts by weight to about 1 part by weight based on a total of 100 parts by weight of the main constituents (i.e., Fe (on an $Fe_2O_3$ basis), Zn (on a ZnO basis), Cu (on a CuO basis), and Ni (on a NiO basis)). The sintered ferrite may further contain incidental impurities introduced during manufacture.

As described above, the coil 7 is composed of the coil conductor layers 15 electrically connected to each other in a coil pattern. The coil conductor layers 15 adjacent to each other in the stacking direction are connected together via the connection conductors extending through the insulator portion 6 (specifically, the first insulator layers 11).

Examples of materials that form the coil conductor layers 15 include, but not limited to, Au, Ag, Cu, Pd, and Ni. The material that forms the coil conductor layers 15 is preferably Ag or Cu, more preferably Ag. Conductive materials may be used alone or in combination.

The thickness of the coil conductor layers 15 may preferably be about 30 μm to about 60 μm, more preferably about 35 μm to about 60 μm, even more preferably about 40 μm to about 60 μm. As the thickness of the coil conductor layers becomes larger, the resistance becomes lower. Here, the thickness refers to the thickness of the coil conductor layers in the stacking direction.

The thickness of the coil conductor layers can be measured as follows.

A chip is polished, with its LT surface facing polishing paper. Polishing is stopped at the central position along the width of the coil conductor layers. Thereafter, observation is performed under a microscope. The thickness at the central position along the length of the coil conductor layers is measured by a measuring function accompanying the microscope.

The coil conductor layers 15 are formed such that the winding portions of the coil 7 are substantially rectangular when viewed in plan view in the stacking direction. That is, the coil conductor layers 15 are formed so as to be substantially rectangular. The coil conductor layers, however, need not form a complete rectangle, but may instead be formed so as to form a portion of a rectangle, preferably at least two sides, more preferably at least three sides, particularly preferably at least three sides and a portion of the remaining side.

The coil conductor layers 15 include rounded corner portions 9 when viewed in plan view in the stacking direction. The corner portions 9 of the coil conductor layers 15 may have a radius of curvature R of about 0.08 mm to about 0.24 mm, preferably about 0.12 mm to about 0.20 mm. If the corner portions 9 of the coil conductor layers 15 have a radius of curvature R of about 0.08 mm or more, cracking can be inhibited. If the corner portions 9 of the coil conductor layers 15 have a radius of curvature R of about 0.24 mm or less, the volume of the magnetic part can be effectively utilized, and good electrical characteristics can thus be achieved. Here, the radius of curvature R of the corner portions of the coil conductor layers refers to the radius of curvature of the outermost side portions of the corner portions of the coil conductor layers.

The radius of curvature of the corner portions of the coil conductor layers can be measured as follows.

Figure 7:
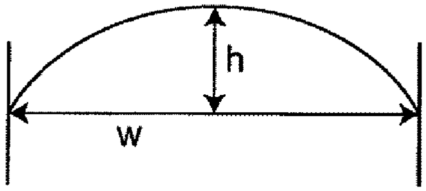
FIG. 7 illustrates a method for determining the radius of curvature R.

An LW surface of a chip is polished in the T direction to expose a coil conductor as illustrated in FIG. 3. An image of a corner portion of the coil conductor is captured under a digital microscope. An imaginary line 16 as illustrated in FIG. 3 is drawn, and the width (w) and height (h) illustrated in FIG. 7 are measured. The radius of curvature R can be calculated from the measured w and h by the following equation:

$$R = \frac{\left(\frac{w}{2}\right)^2 + h^2}{2h}$$

The coil conductor layers 15 preferably have an aspect ratio of about 0.15 to about 0.30, more preferably about 0.20 to about 0.25. Here, the aspect ratio refers to the ratio of the thickness to the width of the coil conductor layers. Here, the thickness is defined in the same manner as the thickness of the coil conductor layers described above and can be measured in the same manner as above. The width refers to the longest dimension of a cross-section of the coil conductor layers.

The connection conductors are disposed so as to extend through the first insulator layers 11. The material that forms the connection conductors may be any of the materials as mentioned for the coil conductor layers 15. The material that forms the connection conductors may be the same as or different from the material that forms the coil conductor layers 15. In a preferred embodiment, the material that forms the connection conductors is the same as the material that forms the coil conductor layers 15. In a preferred embodiment, the material that forms the connection conductors is Ag.

The voids 21 function as so-called stress relaxation spaces.

The thickness of the voids 21 is preferably about 1 μm to about 30 μm, more preferably about 5 μm to about 15 μm.

The width and thickness of the voids can be measured as follows.

A chip is polished, with its LT surface facing polishing paper. Polishing is stopped at the central position along the width of the coil conductor layers. Thereafter, observation is performed under a microscope. The width and thickness of the voids at the central position along the length of the coil conductor layers are measured by a measuring function accompanying the microscope.

In one embodiment, the voids 21 have a larger width than the coil conductor layers 15 in a cross-section perpendicular to the winding direction of the coil. That is, the voids 21 are provided so as to extend beyond both edges of the coil conductor layers 15 in directions away from the coil conductor layers 15.

The outer electrodes 4 and 5 are disposed so as to cover both end surfaces of the body 2. The outer electrodes are formed of a conductive material, preferably one or more metal materials selected from Au, Ag, Pd, Ni, Sn, and Cu.

The outer electrodes may be composed of a single layer or a plurality of layers. In one embodiment, the outer electrodes may be composed of a plurality of layers, preferably two to four layers, for example, three layers.

In one embodiment, the outer electrodes may be composed of a plurality of layers including a layer containing Ag or Pd, a layer containing Ni, or a layer containing Sn. In a preferred embodiment, the outer electrodes are composed of a layer containing Ag or Pd, a layer containing Ni, and a layer containing Sn. Preferably, the outer electrodes are composed of, in sequence from the coil conductor layer side, a layer containing Ag or Pd, preferably Ag, a layer containing Ni, and a layer containing Sn. Preferably, the layer containing Ag or Pd is a layer formed by baking a Ag paste or a Pd paste, and the layer containing Ni and the layer containing Sn may be plating layers.

The multilayer coil component according to the present embodiment preferably has a length of about 0.4 mm to about 3.2 mm, a width of about 0.2 mm to about 2.5 mm, and a height of about 0.2 mm to about 2.0 mm, more preferably a length of about 0.6 mm to about 2.0 mm, a width of about 0.3 mm to about 1.3 mm, and a height of about 0.3 mm to about 1.0 mm.

EXAMPLES

Examples

Preparation of Ferrite Paste

Powders of $Fe_2O_3$, ZnO, CuO, and NiO were weighed such that the amounts thereof were 49.0 mol %, 25.0 mol %, 8.0 mol %, and the balance, respectively, based on the total amount of the powders. These powders were mixed and pulverized, were dried, and were calcined at 700° C. to obtain a calcined powder. Predetermined amounts of a ketone-based solvent, polyvinyl acetal, and an alkyd-based plasticizer were added to the calcined powder, and they were mixed in a planetary mixer and were further dispersed in a three-roll mill. Thus, a ferrite paste was prepared.

Preparation of Conductive Paste for Coil Conductors

A predetermined amount of silver powder was prepared as a conductive material. The silver powder was mixed with eugenol, ethylcellulose, and a dispersant in a planetary mixer and was then dispersed in a three-roll mill. Thus, a conductive paste for coil conductors was prepared.

Preparation of Resin Paste

A resin paste was prepared by mixing isophorone with an acrylic resin.

Fabrication of Multilayer Coil Component

Unfired multilayer blocks were fabricated by the procedure illustrated in FIGS. 5A to 5S using the ferrite paste, the conductive paste, and the resin paste. The conductive paste layers had a thickness of 70 μm. The multilayer blocks were obtained using printing plates such that the corner portions of the conductive paste layers had radii of curvature of 0.05 mm, 0.10 mm, 0.20 mm, and 0.30 mm. After the formation of the conductive paste layers with such radii of curvature, they were pressed at 4 MPa, 6 MPa, or 8 MPa to form multilayer bodies.

The multilayer blocks were then cut into individual elements with a dicer. The resulting elements were subjected to barrel finishing to round the corners of the elements. After barrel finishing, the elements were fired at a temperature of 930° C. to obtain bodies.

A Ag paste containing Ag and glass for formation of outer electrodes was then applied to the end surfaces of the bodies and was baked to form underlying electrodes. A Ni coating and a Sn coating were then formed in sequence over the underlying electrodes by electrolytic plating to form outer electrodes. Thus, multilayer coil components were obtained.

The multilayer coil components obtained as described above each had a length (L) of 1.6 mm, a width (W) of 0.8 mm, and a height (T) of 0.8 mm.

Evaluation

For each type of multilayer coil component obtained as described above, 30 multilayer coil components were evaluated for the presence or absence of cracks. The number of multilayer coil components with cracks is listed in Table 1 below. Multilayer coil components fabricated such that the radii of curvature R of the conductor patterns were 0 and 0.05 mm (the radii of curvature R of the coil conductor layers after firing were 0 and 0.04 mm) are comparative examples.

TABLE 1

| | Radius of curvature R of conductor patterns (mm) | | | | |
|---|---|---|---|---|---|
| | 0 | 0.05 | 0.10 | 0.20 | 0.30 |
| Pressing | Radius of curvature R of coil conductor layers after firing (mm) | | | | |
| pressure | 0 | 0.04 | 0.08 | 0.16 | 0.24 |
| 4 MPa | 24/30 | 30/30 | 0/30 | 0/30 | 0/30 |
| 6 MPa | 24/30 | 18/30 | 0/30 | 0/30 | 0/30 |
| 8 MPa | 18/30 | 12/30 | 0/30 | 0/30 | 0/30 |

The results demonstrated that the multilayer coil components fabricated such that the radius of curvature R of the conductor patterns or the radius of curvature R of the coil conductor layers fell within the scope of the present disclosure were not cracked after firing.

Multilayer coil components according to embodiments of the present disclosure can be used in a wide variety of applications including inductors.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A multilayer coil component comprising:

an insulator portion;

a coil embedded in the insulator portion and including a plurality of coil conductor layers electrically connected together; and an outer electrode disposed on a surface of the insulator portion and electrically connected to the coil, wherein each of the coil conductor layers has a thickness of 30 μm to 60 μm, and each of the coil conductor layers is rectangular and includes a corner portion with a radius of curvature of 0.08 mm to 0.24 mm, the insulator portion is a multilayer body including first insulator layers and second insulator layers, the coil conductor layers are disposed on the first insulator layers, and the second insulator layers are disposed on the first insulator layers so that each upper surface of the coil conductor layers is in contact with a respective one of the first insulator layers and a respective one of the second insulator layers.

2. The multilayer coil component according to claim 1, wherein each of the coil conductor layers has an aspect ratio of 0.15 to 0.30.

3. The multilayer coil component according to claim 2, wherein the multilayer coil component has voids between the coil conductor layers and the insulator portion.

4. The multilayer coil component according to claim 1, wherein the multilayer coil component has voids between the coil conductor layers and the insulator portion.

5. The multilayer coil component according to claim 1, wherein at least one second insulator layer of the second insulator layers extends over a respective one coil conductor layer of the coil conductor layers to cover outer edge portions of the respective one coil conductor layer of the coil conductor layers.

6. The multilayer coil component according to claim 1, wherein each coil conductor layer of the coil conductor layers is positioned adjacent to one second insulator layer of the second insulator layers when viewing each coil conductor layer of the coil conductor layers in a direction perpendicular to a width of the coil conductor.

7. The multilayer coil component according to claim 1, wherein a first coil conductor layer of the coil conductor layers is positioned to contact one second insulator layer of the second insulator layers in a width direction and in a height direction.

8. The multilayer coil component according to claim 7, wherein the one second insulator layer of the second insulator layers contacts the first conductor layer of the coil conductor layers by extending past an outer edge of the first coil conductor layer of the coil conductor layers inwardly of the first conductor layer of the coil conductor layers.

9. A method for manufacturing a multilayer coil component including:

an insulator portion;

a coil embedded in the insulator portion and including a plurality of coil conductor layers electrically connected together; and an outer electrode disposed on a surface of the insulator portion and electrically connected to the coil, the method comprising:

forming a first insulating paste layer by an insulating paste;

forming a rectangular conductive paste layer on the first insulating paste layer;

forming a second insulating paste layer by an insulating paste on the first insulating paste layer so as to be adjacent to the conductive paste layer;

repeating the forming of a first insulating paste layer, the forming of a rectangular conductive paste layer and the forming of a second insulating paste layer, to form an unfired multilayer body; and firing the unfired multilayer body, wherein the conductive paste layers include a corner portion with a radius of curvature of 0.10 mm to 0.30 mm, wherein in each forming of the first insulating paste layer, the conductive paste layer, and the second insulating paste layer, the second insulating paste layer is disposed on the first insulating paste layer so that an upper surface of the conductive paste layer is in contact with the first insulating paste layer and the second insulating paste layer.

10. The method according to claim 9, further comprising:

after forming the first insulating paste layer, the conductive paste layer, and the second insulating paste layer, pressing the individual layers at a pressure of 4 MPa to 8 MPa.

11. A multilayer coil component comprising:

an insulator portion;

a coil embedded in the insulator portion and including a plurality of coil conductor layers electrically connected together; and an outer electrode disposed on a surface of the insulator portion and electrically connected to the coil, wherein each of the coil conductor layers has a thickness of 30 μm to 60 μm, and each of the coil conductor layers is rectangular and includes a corner portion with a radius of curvature of 0.08 mm to 0.24 mm, the insulator portion is a multilayer body including first insulator layers and second insulator layers, the coil conductor layers are disposed on the first insulator layers, and the second insulator layers are disposed on the first insulator layers so that each upper surface of the coil conductor layers is in contact with a respective one of the first insulator layers and a respective one of the second insulator layers, wherein each coil conductor layer of the coil conductor layers is positioned adjacent to one second insulator layer of the second insulator layers when viewing each coil conductor layer of the coil conductor layers in a direction perpendicular to a width of the coil conductor, and wherein the one second insulator layer extends inwardly of outer edges of the each coil conductor layer of the coil conductor layers.

* * * * *